Oct. 14, 1924.  
C. L. HORD  
BROOD SOW MUZZLE  
Filed April 7, 1924

1,511,339

Carl L. Hord,  
Inventor

By Clarence A. O'Brien  
Attorney

Patented Oct. 14, 1924.

1,511,339

UNITED STATES PATENT OFFICE.

CARL L. HORD, OF HALLOCK, MINNESOTA.

BROOD-SOW MUZZLE.

Application filed April 7, 1924. Serial No. 704,804.

*To all whom it may concern:*

Be it known that I, CARL L. HORD, a citizen of the United States, residing at Hallock, in the county of Kittson and State of Minnesota, have invented certain new and useful Improvements in Brood-Sow Muzzles, of which the following is a specification.

This invention relates to a muzzle which is to be worn by a sow while farrowing and has for its principal object to provide a device which when worn will prevent the sow from eating her offspring.

A further object of the invention is to provide a device of the above mentioned character, which when worn by the sow will not interfere with the usual drinking or eating.

A still further object of the invention is to provide a device of the above mentioned character which is of such a construction as to permit the same to be readily placed in position on the head of the sow and held thereon against accidental displacement therefrom.

A still further object of the invention is to provide a device of the above mentioned character, which is simple in construction, inexpensive, strong and durable and furthermore adapted for the purposes for which it is designated.

Other objects and advantages of this invention will become apparent during the course of the following description.

Figure 1:
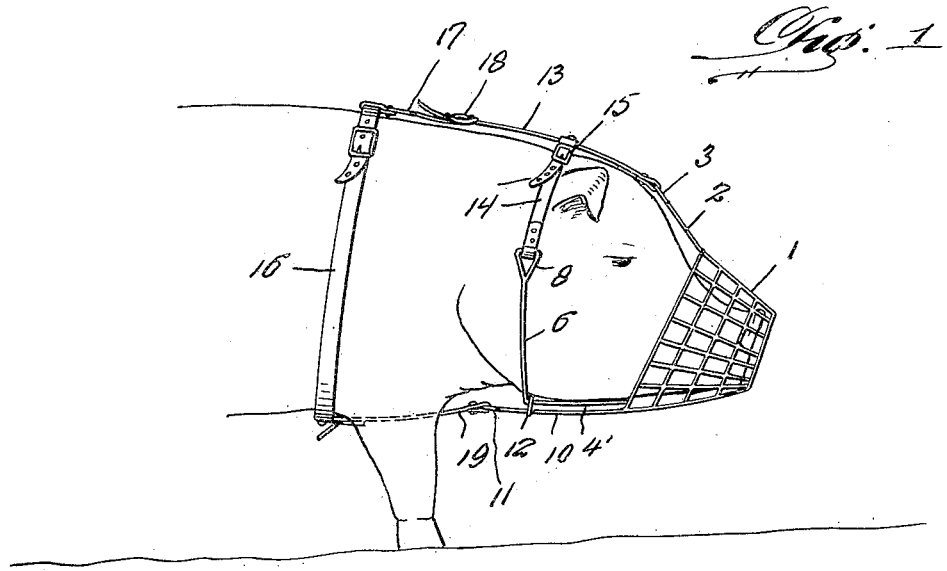
Figure 2:
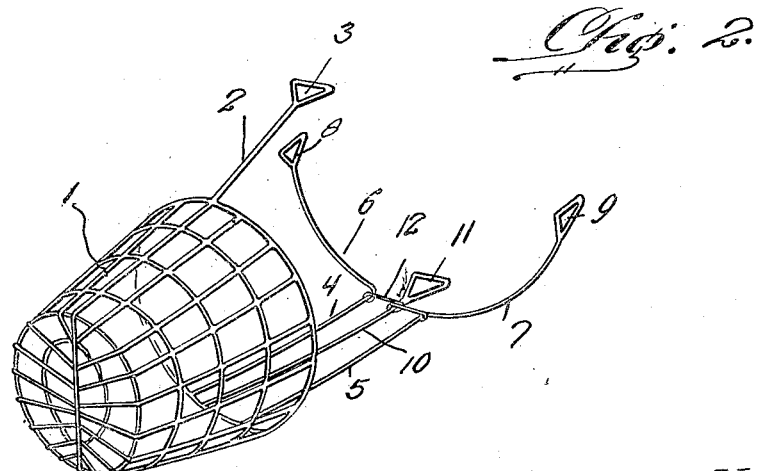

In the accompanying drawing forming a part of this specification and in which like numerals designate like parts throughout the same:

Figure 1 is a side elevation of my invention showing the same in position when in use, and Figure 2 is a detail perspective view of my improved muzzle.

In the drawing wherein for the purpose of illustration is shown the preferred embodiment of my invention, the numeral 1 designates the cage of the muzzle and the same is preferably formed of wire, the wires comprising the cage being arranged in proper spaced relation and supported therein by any suitable means such as by employing solder or the like. The cage is of such a construction as to fit over and enclose the mouth of the sow in the manner clearly illustrated in Figure 1 of the drawing.

Extending rearwardly from the top of the cage 1 is the wire 2, the outer end of which terminates in an eye 3. Extending rearwardly from the bottom of the cage 1 and arranged in parallel spaced relation are the wires 4 and 5 respectively. The wires 4 and 5 extend rearwardly from the cage 1 for a distance slightly greater than that which the wire 2 extends in the manner clearly illustrated in Figure 1 of the drawing and the purpose thereof will hereinafter be more fully described. The outer ends of the wires 4 and 5 are curved outwardly in opposite directions and are disposed upwardly as shown at 6 and 7 respectively in the drawing. The outer free ends of the curved portions 6 and 7 are also provided with the eyes 8 and 9 respectively.

An additional wire 10 extends rearwardly from the bottom of the cage 1 and is disposed between the wires 4 and 5 in the manner clearly illustrated in Figure 2 of the drawing. The outer end of the wire 10 extends beyond the terminations of the wires 4 and 5 and is provided thereon with the eyes 11. For the purpose of holding the outer ends of the wires 4, 5 and 10 respectively in proper spaced relation, I provide the supporting and bracing strip 12, the same being interlooped in each of the longitudinally extending wires in the manner clearly illustrated in Figure 2 of the drawing.

When in position on the animal, the cage 1 extends over the mouth and nose of the animal and the wire 2 extends rearwardly on the head of the animal. The wires 4, 5 and 10 respectively extend rearwardly and the curved portions 6 and 7 extend upwardly on the sides of the animal's head and are disposed directly behind the ears of the sow. For the purpose of holding the muzzle in position on the animal, I provide the strap 13 which is fastened to the eye 3 of the upper wire 2 and extends rearwardly for a suitable distance. The eyes 8 and 9 of the curved portions 6 and 7 respectively are also secured to suitable straps such as are shown at 14 and the free ends of the straps are fastened together by any suitable fastening means such as is shown at 15. The straps 14 are further adapted to be associated with the strap 13 in the manner clearly shown in Figure 1 of the drawing.

A body encircling strap 16 is positioned on the animal and is located directly in the rear of the front legs of the animal. The upper portion of the body encircling strap 16 is fastened to the free end of the strap 13 by a similar strap 17, any suitable fastening means such as is shown at 18 being provided therefor. A strap 19 is connected at one end to the eye 11 formed in the wire 10 and is disposed between the front legs of the animal and fastened to the bottom of the body encircling strap 16. The straps are preferably formed of leather and are provided with the usual buckles thereon whereby the same may be readily fastened or unfastened as the case may be.

By providing a harness of the character above described in connection with my muzzle, the latter will be prevented from accidental displacement and will at all times insure the supporting of the muzzle on the head of the animal.

The provision of a muzzle of the above mentioned character, will prevent a sow from eating or killing her young and furthermore will not interfere with the usual drinking and eating.

The simplicity of my device enables the same to be manufactured at a very low cost and will be strong and durable.

While I have shown the preferred embodiment of my invention, it is to be understood that various changes in the size, shape and arrangement of parts may be resorted to without departing from the spirit of the invention and the scope of the appended claims.

Having thus described my invention, what I claim is:—

1. An animal muzzle comprising a cage, spaced wires disposed rearwardly from the cage and connected with the cage at the lower portion thereof, means connecting the intermediate portions of said wires together, the said wires being provided with angularly disposed and longitudinally curved rear end portions adapted to extend around the jaws of the animal, and a harness for securing the said angularly disposed and longitudinally curved rear end portions of the wires to the head of the animal.

2. An animal muzzle comprising a cage, spaced wires extending rearwardly from the cage and connected with the same at the lower portion thereof, means connecting the intermediate portions of the said wires together, the said wires being provided with angularly disposed and longitudinally curved rear end portions, other wires connected with the cage and located one at the upper portion thereof and one at the lower portion thereof and between the first mentioned wires, and a harness for securing all of the wires upon the head of the animal.

In testimony whereof I affix my signature.

CARL L. HORD.